(12) United States Patent
Kim

(10) Patent No.: US 11,639,100 B1
(45) Date of Patent: May 2, 2023

(54) WIND CHARGER FOR VEHICLE

(71) Applicant: Chuil Peter Kim, Jacksonville, FL (US)

(72) Inventor: Chuil Peter Kim, Jacksonville, FL (US)

( * ) Notice: Subject to any disclaimer, the term of this patent is extended or adjusted under 35 U.S.C. 154(b) by 29 days.

(21) Appl. No.: 17/544,675

(22) Filed: Dec. 7, 2021

(51) Int. Cl.
| | |
|---|---|
| *B60K 16/00* | (2020.01) |
| *F03D 9/32* | (2016.01) |
| *B60L 8/00* | (2006.01) |
| *B60L 50/60* | (2019.01) |
| *H02J 7/14* | (2006.01) |
| *B60L 53/24* | (2019.01) |
| *B60K 1/00* | (2006.01) |

(52) U.S. Cl.
CPC ............. *B60K 16/00* (2013.01); *B60K 1/00* (2013.01); *B60L 8/006* (2013.01); *B60L 50/60* (2019.02); *B60L 53/24* (2019.02); *F03D 9/32* (2016.05); *H02J 7/143* (2020.01)

(58) Field of Classification Search
CPC ..... B60K 16/00; B60K 2016/006; F03D 9/32; B60L 50/60; B60L 53/24; B60L 8/006
See application file for complete search history.

(56) References Cited

U.S. PATENT DOCUMENTS

| | | | | |
|---|---|---|---|---|
| 4,075,545 | A | * | 2/1978 | Haberer ................... F03D 9/11 180/2.2 |
| 6,373,145 | B1 | * | 4/2002 | Hamrick .................. F03D 9/25 290/55 |
| 9,059,601 | B2 | * | 6/2015 | Rogers .................... F03D 15/10 |
| 10,160,330 | B2 | | 12/2018 | Kim |
| 10,479,197 | B1 | | 11/2019 | Kim |
| 10,655,604 | B1 | * | 5/2020 | Parker ................... F01D 17/162 |
| 2007/0202976 | A1 | * | 8/2007 | Luedtke ................ B60W 10/24 474/69 |
| 2012/0299526 | A1 | * | 11/2012 | Lambert ............... H01M 10/46 74/DIG. 9 |
| 2017/0276120 | A1 | * | 9/2017 | Petrosyan ................. F03D 9/32 |

FOREIGN PATENT DOCUMENTS

| WO | WO-2018203348 A1 | * | 11/2018 |
| WO | 2020139410 A1 | | 7/2020 |

* cited by examiner

*Primary Examiner* — John D Walters
(74) *Attorney, Agent, or Firm* — Rabin & Berdo, P.C.

(57) ABSTRACT

A rotating system includes a motor including a shaft, an impeller configured to rotate with the shaft and located in a path of air, an alternator including a rotor configured to rotate with the shaft; and at least one secondary battery configured to be charged by the alternator. Rotation of the shaft is configured to be driven by either the motor or the impeller.

20 Claims, 7 Drawing Sheets

WIND CHARGER FOR VEHICLE

FIELD OF THE INVENTION

The present disclosure relates systems and methods for powering a vehicle and, more particularly, systems and methods for charging a battery of a vehicle using wind power.

BACKGROUND OF THE INVENTION

Electric vehicles, which are seen as eco-friendly and cost less for consumers to operate, have gained a significant share of the global automobile market in recent years. However, a complete move away from combustion engine as a power source has been difficult due to the limited battery capacities of electric vehicles as well as the shortage of charging stations for such vehicles. Thus, an alternative or additional means of charging the secondary batteries on an electric vehicle would help overcome some of the limitations faced by electric or hybrid vehicles and allow such vehicles to become the primary means of transportation for road travel.

SUMMARY OF THE INVENTION

In one example, a vehicle comprises a first passage including a first entry, a first chamber and a first exit. The first passage is configured to direct air from the first entry to the first exit through the first chamber. The vehicle further comprises a second passage including a second entry, a second chamber and a second exit. The second passage is configured to direct air from the second entry to the second exit through the second chamber. The vehicle further comprises a motor including a shaft, a first impeller configured to rotate with the shaft and located in the first chamber, a second impeller configured to rotate with the shaft and located in the second chamber, a first alternator including a first rotor configured to rotate with the shaft, a second alternator including a second rotor configured to rotate with the shaft; and at least one secondary battery operatively connected to the first alternator and the second alternator. The at least one secondary battery is configured to be charged by the first alternator or the second alternator. The shaft of the motor is rotated by either air through the first passage or air through the second passage.

In another example, a method of powering a vehicle is provided. The method comprises providing a first path of air and a second path of air moving through the vehicle; providing a rotating mechanism including a motor including a shaft, a first impeller, a second impeller, a first alternator including a first rotor, and a second alternator including a second rotor, the shaft of the motor extending through the first rotor and the second rotor; positioning the rotating mechanism such that the first impeller is located in the first path of air and the second impeller is located in the second path of air; providing at least one secondary battery to be charged by the first alternator or the second alternator; and charging the at least one secondary battery using the first alternator or the second alternator.

In yet another example, a rotating system comprises a motor including a shaft, an impeller configured to rotate with the shaft, an alternator including a rotor located in the chamber, where the rotor is configured to rotate with the shaft, and at least one secondary battery operatively connected to the alternator. The at least one secondary battery is configured to be charged by the alternator. The shaft is configured to be rotated by either the motor or the impeller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
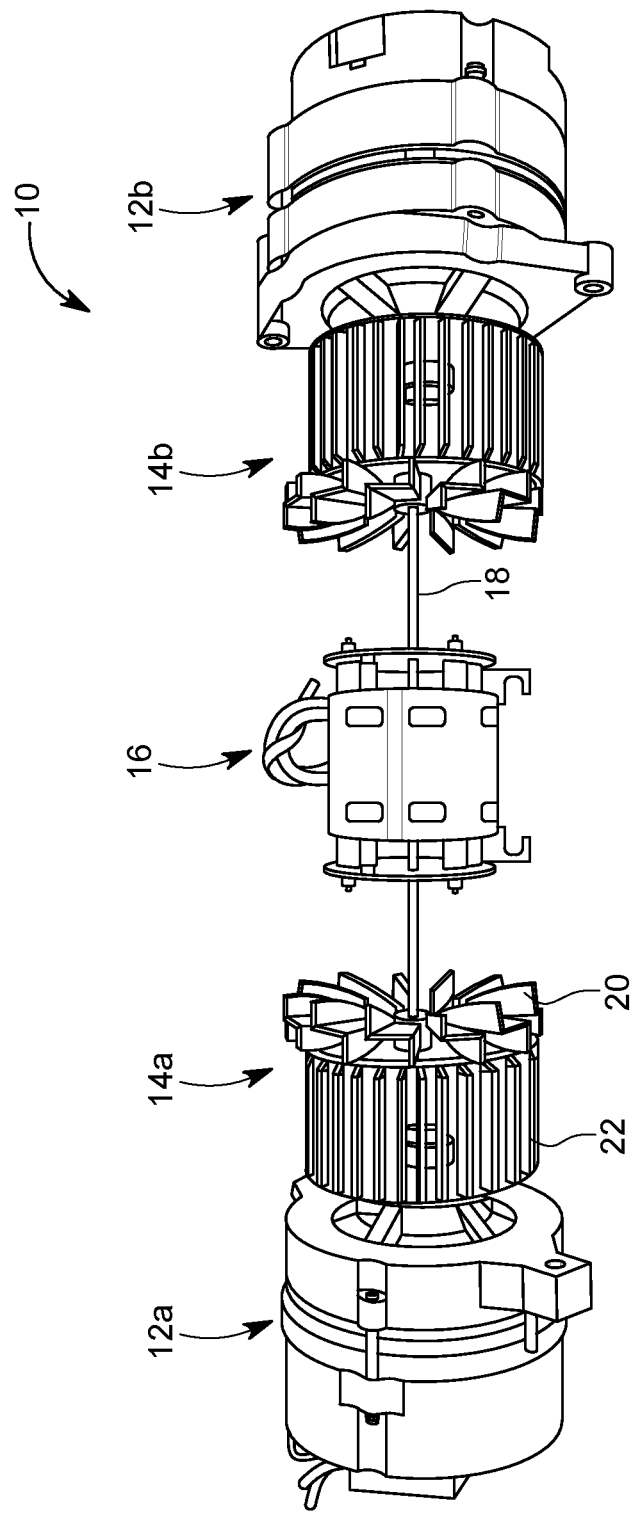
FIG. 1 is a top perspective view of an example embodiment of a rotating mechanism in accordance with the present disclosure.

FIG. 1 illustrates an example embodiment of a system 100 including a rotating mechanism 10 that may be implemented on a vehicle 1 (FIG. 2) that is at least partially powered by electricity. Such a vehicle 1 may be an electric vehicle, a hybrid vehicle, a bus, a truck, or the like or other transportation means such as a train, a ship or the like. As shown in FIG. 1, the rotating mechanism 10 may include a first alternator 12a, a first impeller 14a, a motor 16, a second impeller 14b and a second alternator 12b. The rotating mechanism 10 may further include a shaft 18 extending through the aforementioned components of the rotating mechanism 10. In the embodiment of FIG. 1, the first and second impellers 14a, 14b are a combination of a blower-wheel impeller 22 and a bladed impeller 20 but may be other types of impellers that are rotatable by the movement of fluid therethrough. Each of the first and second alternators 12a, 12b may include a rotor and a stator where each rotor is rotated by the rotation of the shaft 18 to generate electrical energy for the respective alternator 12a or 12b. Thus, the shaft 18 may be rotated by the motor 16 or by the rotation of the first impeller 14a or the second impeller 14b, and the rotation of the shaft 18 rotates the rotors of the alternators 12a, 12b.

In an example embodiment, the alternator 12a or 12b may be a Mecc Alte tapered cone generator head or a Mecc Alte single-bearing generator. The impeller 14a or 14b may include a blower wheel from Carrier. The motor 16 may be a double shaft motor from Century, and may be a brushless direct current motor. The motor 16 may also function as a bearing when the motor 16 is not turned on but moving in a passive manner.

It must be noted that the rotating mechanism 10 may include less or more of the aforementioned components. For example, the rotating mechanism 10 may include one alternator instead of two, one impeller instead of two, two or more motors instead of one, or any other combination of the aforementioned types of components. The rotating mechanism 10 may also include one or more balance weights and, for example, the bladed impellers may be replaced with balance weights.

Figure 2:
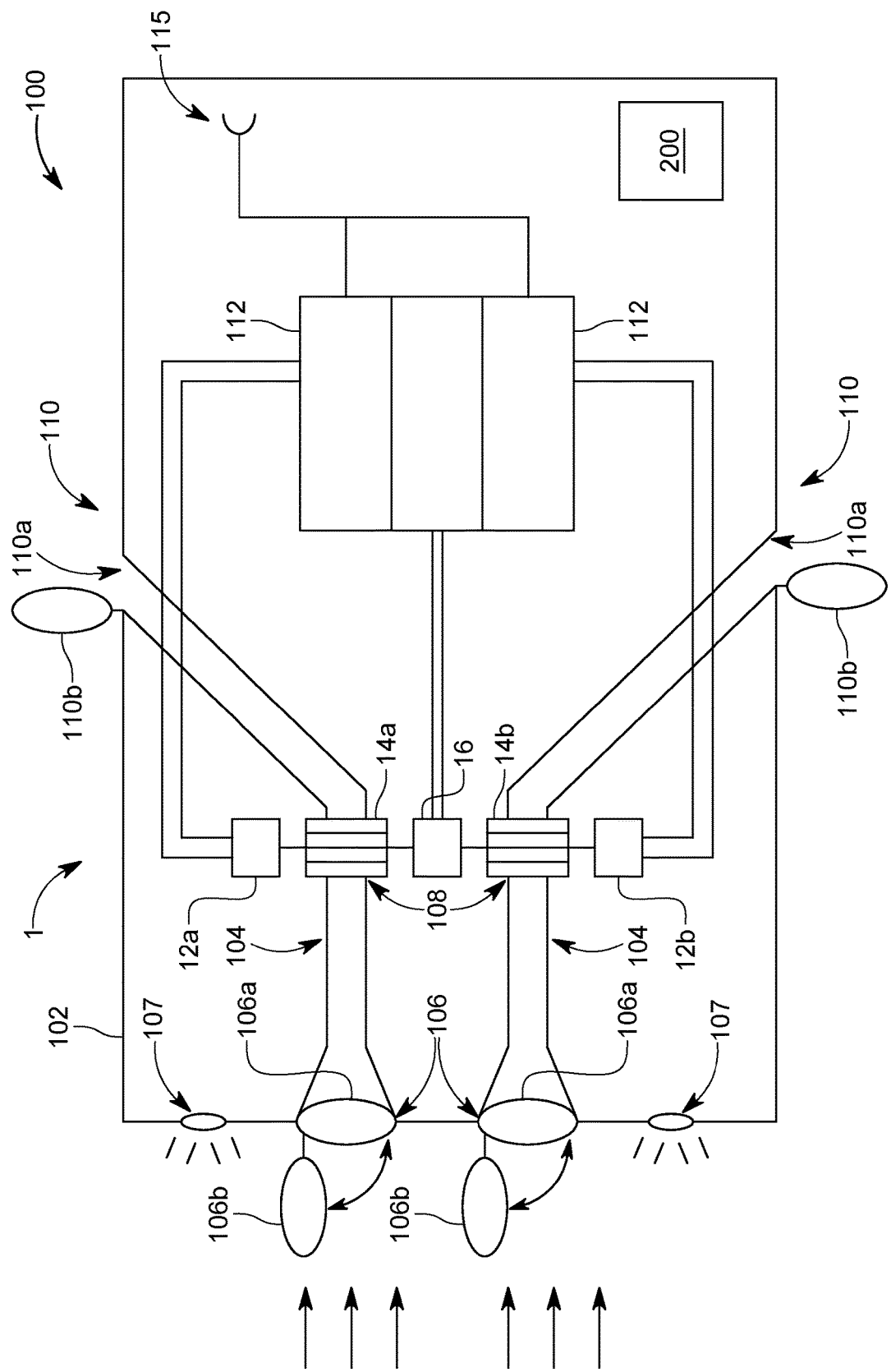
FIG. 2 is a schematic view of an example embodiment of a vehicle body implemented with a charging system including the rotating mechanism in accordance with the present disclosure.

FIG. 2 illustrates schematically an example embodiment of a system 100 for powering a vehicle 1 using the rotating mechanism 10 of FIG. 1. The vehicle 1 may include a body 102 in which one or more passages 104 are formed to create paths of air through which air is directed or guided as the vehicle 1 is moving. In the example embodiment of FIG. 2, two passages 104 are formed where each passage 104 includes an entry 106, a chamber 108, and an exit 110. The entry 106 may be defined by an entry aperture 106*a* formed on the body 102 of the vehicle 1, and may include a cover 106*b* that closes or opens the entry aperture 106*a*. Similarly, the exit 110 may be defined by an exit aperture 110*a* formed on the body 102 of the vehicle 1 and may include a cover 110*b* that closes and opens the exit aperture 110*a*. In the present embodiment, the passages 102 have a bent shape in the form of an L or V but may be shaped differently in other embodiments. The passages 102 may be bent at multiple portions instead of a single portion as shown in FIG. 2. The opening or closing of the entry apertures 106*a* or exit apertures 110*a* may occur automatically in conjunction with the operation of the rotating mechanism 10 by an electronic control unit (ECU) 200. Specifically, the ECU 200 may open the entry and exit apertures 106*a*, 110*a* if the ECU 200 detects the use of the impellers 14*a*, 14*b* or if the ECU 200 detects that the use of the impellers 14*a*, 14*b* is about to occur. Similarly, the ECU 200 may close the entry and exit apertures 106*a*, 110*a* if the use of the impellers 14*a*, 14*b* is over or no longer needed. As shown in the embodiment of FIG. 2, the entry apertures 106*a* may be formed on a front panel of the body 102 of the vehicle 1 while the exit apertures 110*a* may be formed on side panels of the vehicle 1. However, these apertures 106*a*, 110*a* may be located at other parts of the body 102 of the vehicle 1 in other embodiments.

The rotating mechanism 10 may be positioned such that the first and second impellers 14*a*, 14*b* are located in the chamber of the passages 104 in such a way that the blower-wheel impellers 22 and bladed impellers 20 are rotated by the air moving through the passages 104. Such rotation of the first and second impellers 14*a*, 14*b* leads to the rotation of the shaft 18 and consequently of the rotors in the first and second alternators 12*a*, 12*b*.

As further illustrated in FIG. 2, the first and second alternators 12*a*, 12*b* may be operatively connected to one or more secondary batteries 112 mounted on the vehicle 1 such that the rotational movement of the rotors is converted to electrical energy for the secondary batteries 112. The secondary batteries 112 may also be operatively connected with the motor 16 of the rotating mechanism 10 to power the rotation of the shaft 18. However, the motor 16 may be powered by another battery or a different type of battery (e.g., primary battery). The system 100 may also provide a charging port 115 to allow charging of the secondary batteries 112 by connecting the charging port 115 to a 120V or 240V power outlet. The secondary batteries 112 may also power other electrical devices of the vehicle 1 such as the headlights 107 (FIG. 2), brake lights, audio, the electronic control unit, or the like.

Figure 3A:
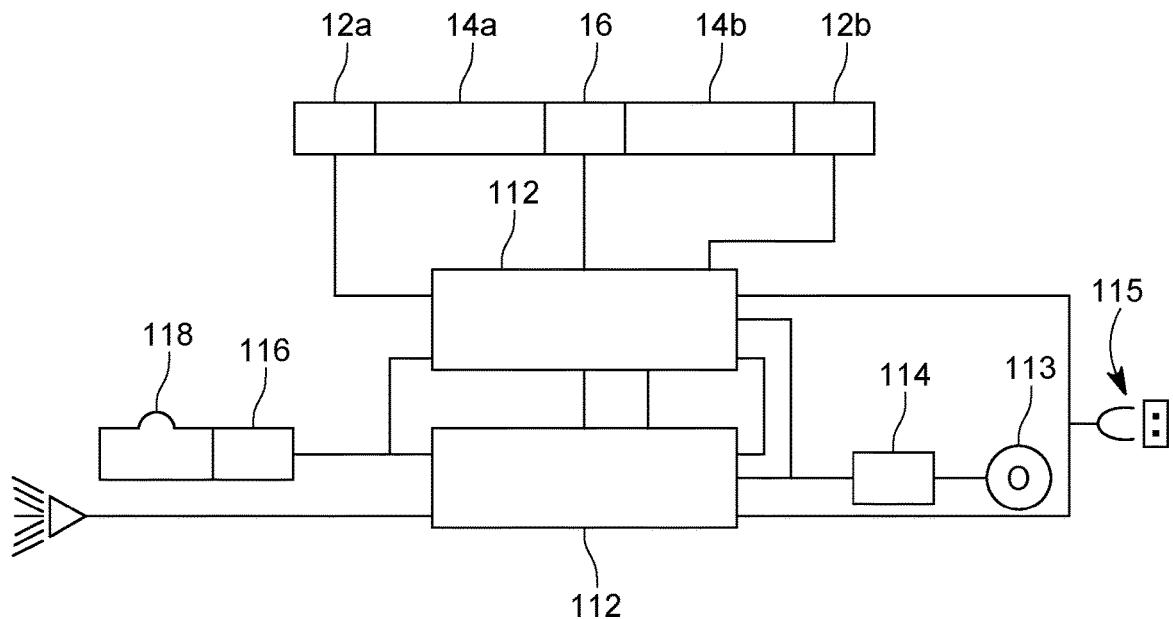
FIG. 3A is a schematic illustration of a first example embodiment of a battery arrangement in the charging system in accordance with the present disclosure.
Figure 3B:
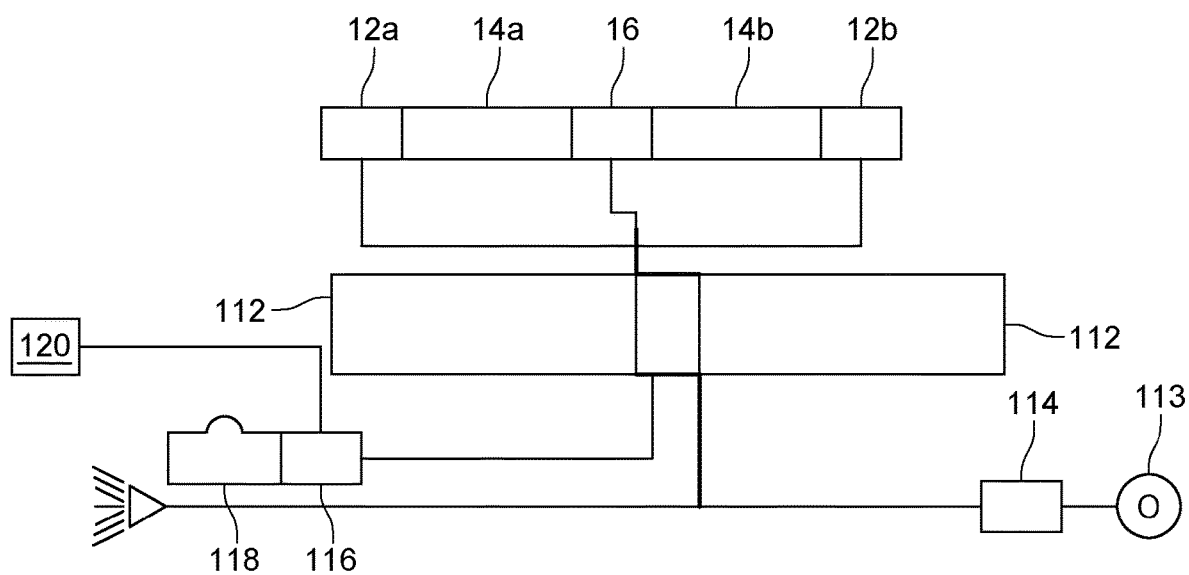
FIG. 3B is a schematic illustration of a second example embodiment of a battery arrangement in the charging system in accordance with the present disclosure.

FIGS. 3A and 3B illustrate alternative embodiments of the system 100 that may be generated based on the embodiment of FIG. 2. The example embodiment in FIG. 3A illustrates the secondary batteries 112 connected to the rotating mechanism 10 as well as a motor 114 and a drivetrain 113, and an alternator 116 operatively connected to a combustion engine 118. Unlike FIG. 3B, the secondary batteries 112 in the example embodiment of FIG. 3A may be charged through a charging port 115 connectable to a power outlet. The example embodiment in FIG. 3B illustrates the secondary batteries 112 connected to a rotating mechanism 10 as well as a motor 114 and the drivetrain 113, a solar panel 120 and an alternator 116 operatively connected to a combustion engine 118. The configurations of FIGS. 3A-3B may be embodied in a hybrid vehicle, for example.

Figure 4:
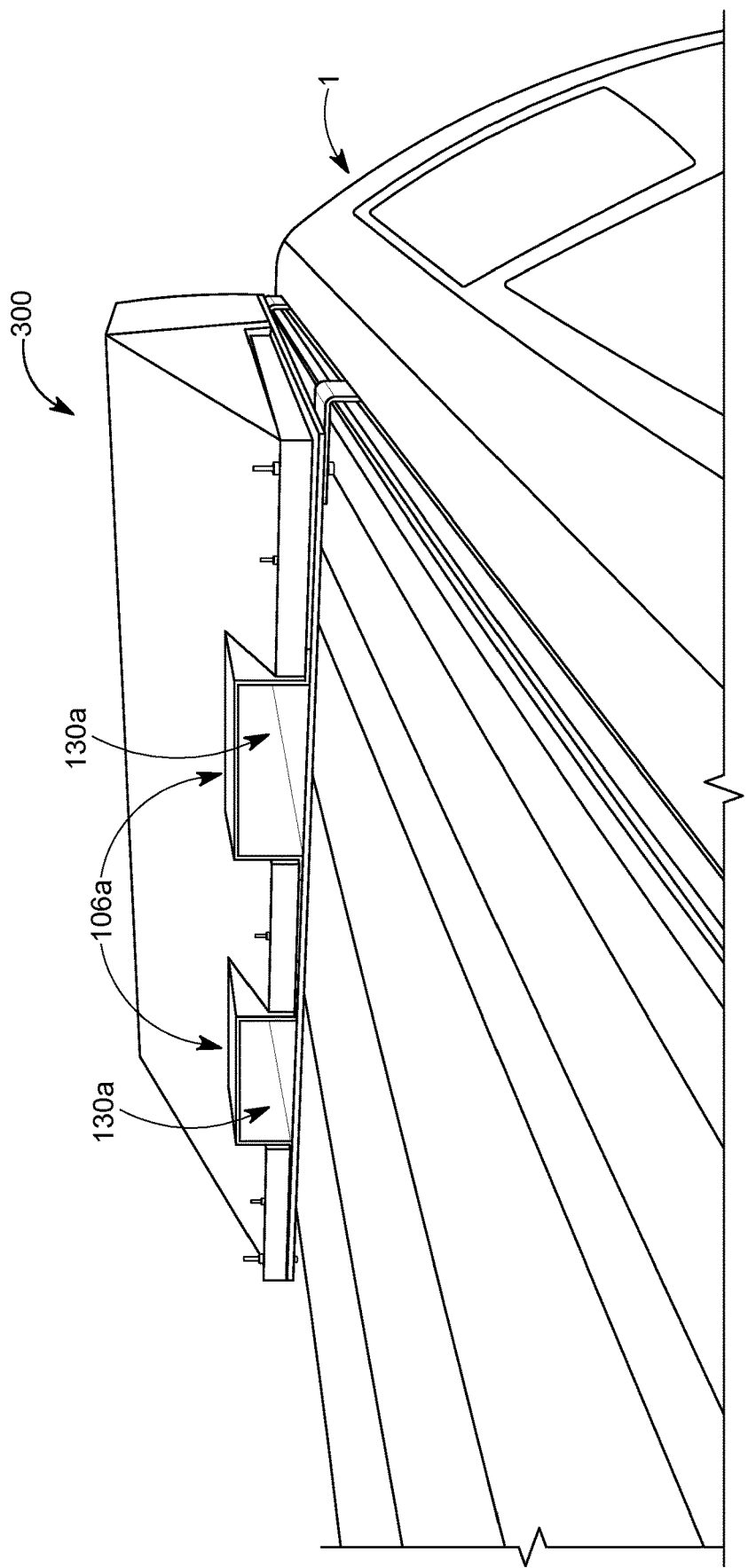
FIG. 4 is a front side view of an example embodiment of a wind tunnel implemented with the rotating mechanism in accordance with the present disclosure.
Figure 5:
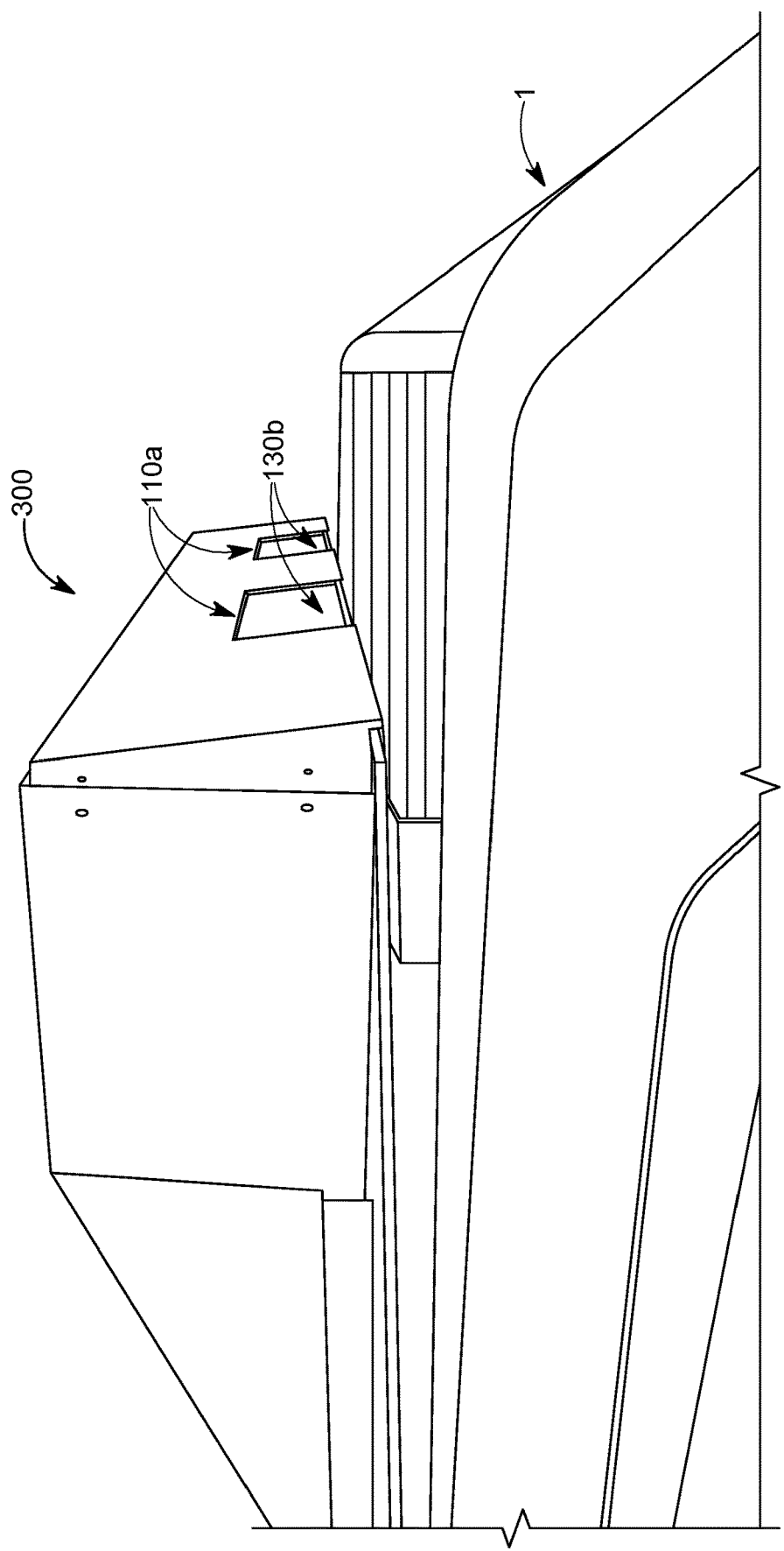
FIG. 5 is a side view of the wind tunnel in accordance with the present disclosure.
Figure 6:
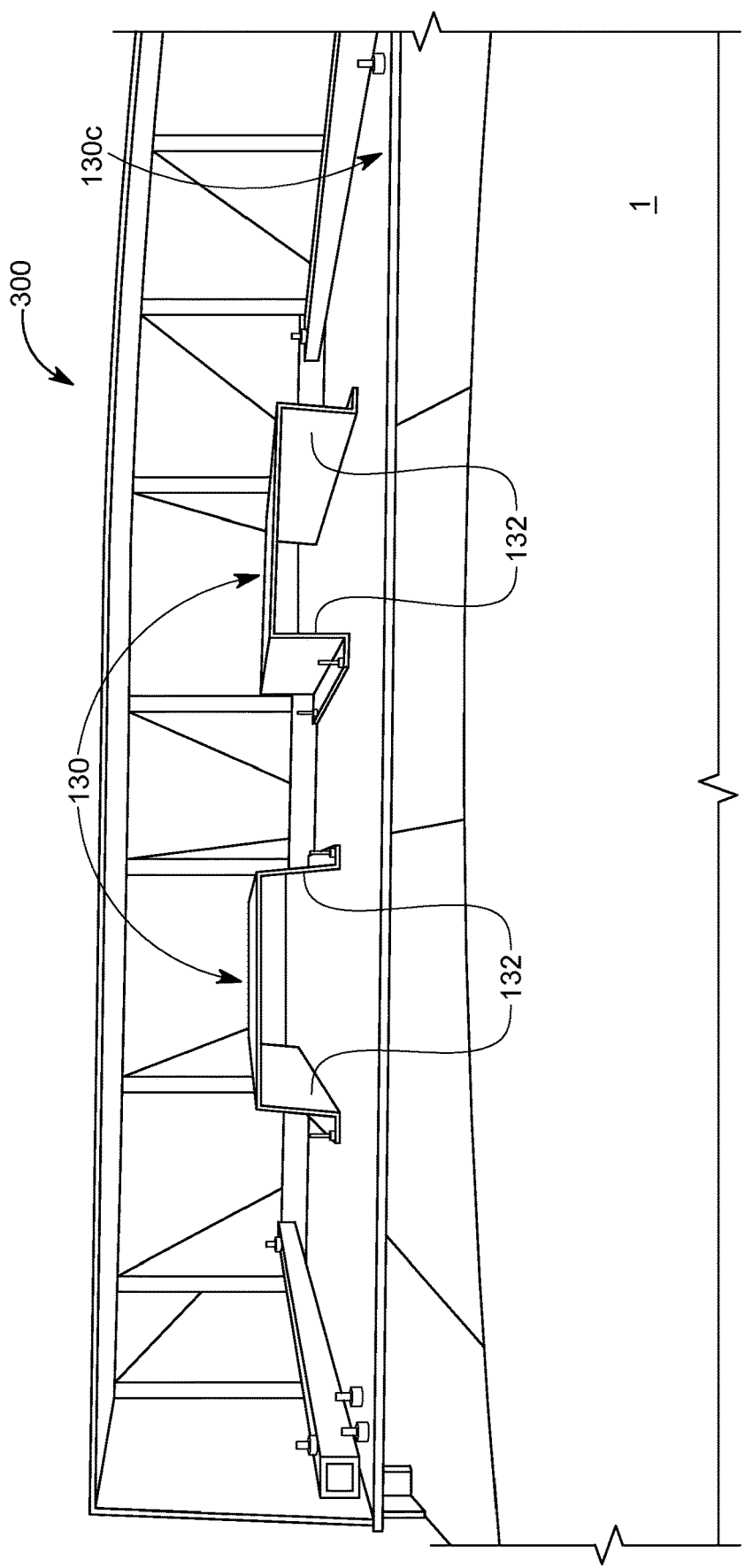
FIG. 6 is a rear view of an inside of the wind tunnel without the rotating mechanism in accordance with the present disclosure.
Figure 7:
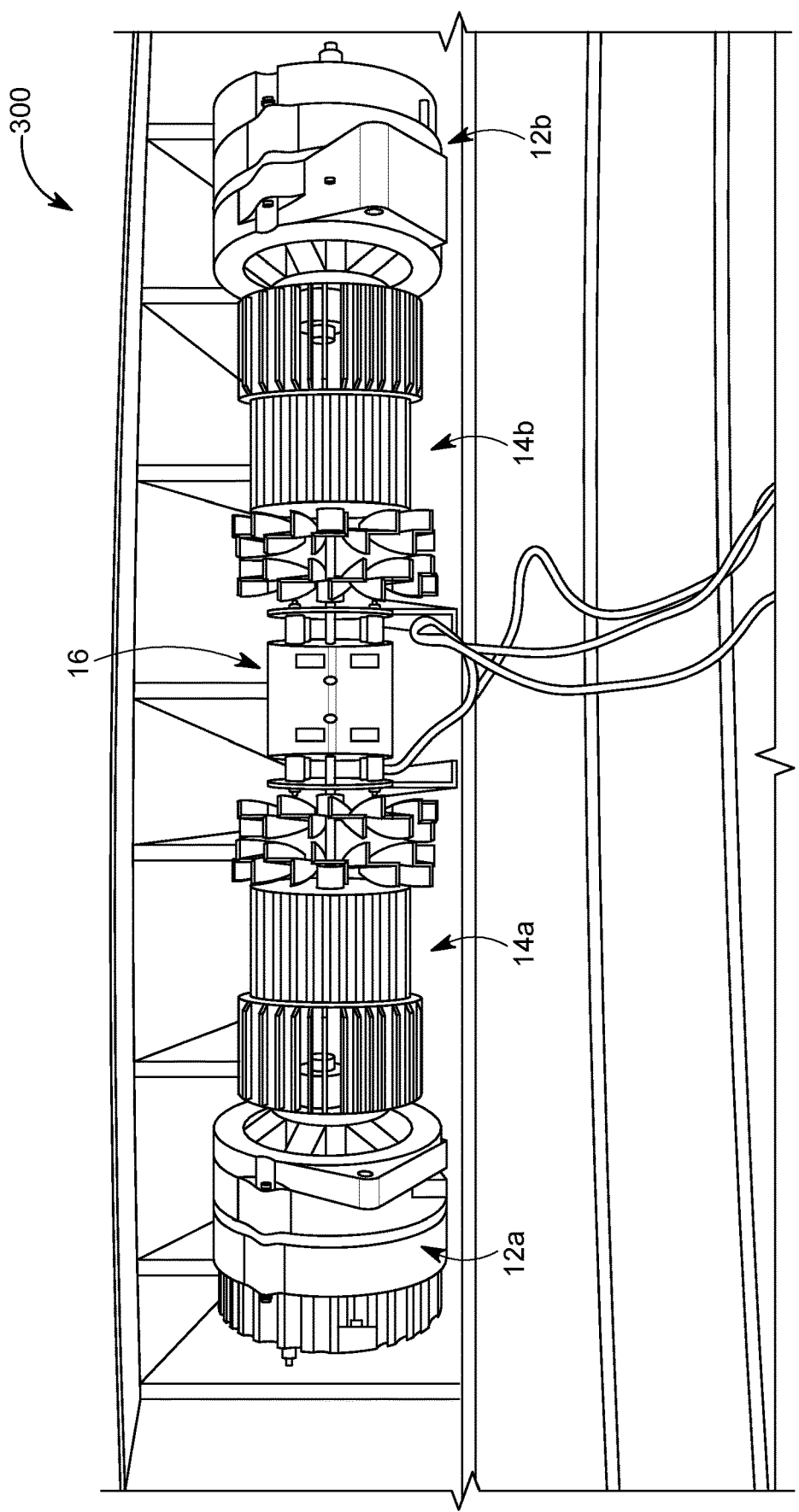
FIG. 7 is a view of the inside of the wind tunnel implemented with the rotating mechanism in accordance with the present disclosure.

FIGS. 4-7 illustrate an example embodiment of the system configured as a rack 300 to be mounted on a roof of a passenger cabin of a vehicle 1. It must be noted that, in alternative embodiments, the passages 104 and the wind tunnels 130 may be formed internally of the body 102 of the vehicle 1. The rack 300 of the present embodiment includes two passages 104 of air although the number of passages 104 may vary by embodiment. The rack 300 may include entry apertures 106*a* on the fore side (FIG. 4) and exit apertures 110*a* on the aft side (FIG. 5). The rack 300 may include wind tunnels 130 that guide air from the entry apertures 106*a* towards the exit apertures 110*a*, as partly observable in FIG. 6. The wind tunnels 130 may be divided into fore sections 130*a*, aft sections 130*b* and intermediate gap sections 130*c* between the fore sections 130*a* and the aft sections 130*b*. The fore sections 130*a* and the aft sections 130*b* may include walls 132 that combine to form the wind tunnel 130 (FIG. 6). As shown in FIG. 7, the rotating mechanism 10 may be located in the intermediate gap sections 130*c*.

A cross-sectional area of the rack 300 may increase from the fore side to the aft side. For example, as shown in the embodiment of FIGS. 4-5, the cross-sectional area of the rack 300 may increase from the fore side to a longitudinally intermediate point of the rack and may be substantially constant from the intermediate point to the aft side.

In this configuration, as the vehicle moves, the air may pass through the wind tunnels 130 and rotate the first and second impellers 14*a*, 14*b* of the rotating mechanism 10 which in turn rotate the shaft 18 of the rotating mechanism 10 to generate electricity.

In one example embodiment, the ECU 200 of the vehicle 1 may be configured to activate or turn on the motor 16 in order to rotate the shaft 18 of the rotating mechanism 10. The ECU 200 may also be configured to rely on the motor 16 as the sole source of power in order to rotate the shaft 18 as the vehicle 1 accelerates from 0 mph up to a low predetermined speed (e.g., 40 mph). Thereafter, the ECU 200 may be configured to keep the motor 16 on and open the first and second entry apertures 106*a* thereby allowing air to reach the first and second impellers 14*a*, 14*b* in order to maintain rotation of the shaft 18 while the speed of the vehicle 1 is between the low predetermined speed and a high predetermined speed (e.g., 60 mph). Furthermore, the ECU 200 may be configured to deactivate or turn off the motor 16 and to rely solely on the first and second impellers 14*a*, 14*b* in order to maintain rotation of the shaft 18 while the vehicle 1 travels above the high predetermined speed. The motor 16 may simply be used as a bearing for the shaft 18 above the high predetermined speed. The ECU 200 may also close the first and second entry apertures 106a and the exit apertures 110a when the first and second impellers 14a, 14b are not in use.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
a first passage including a first entry, a first chamber and a first exit, the first passage configured to direct air from the first entry to the first exit through the first chamber;
a second passage including a second entry, a second chamber and a second exit, the second passage configured to direct air from the second entry to the second exit through the second chamber;
a motor including a shaft;
a first impeller configured to rotate with the shaft and located in the first chamber;
a second impeller configured to rotate with the shaft and located in the second chamber;
a first alternator including a first rotor configured to rotate with the shaft;
a second alternator including a second rotor configured to rotate with the shaft; and
at least one secondary battery operatively connected to the first alternator and the second alternator, the at least one secondary battery configured to be charged by the first alternator or the second alternator,
wherein the shaft of the motor is rotated by either air through the first passage or air through the second passage.

2. The vehicle of claim 1, wherein the at least one secondary battery is configured to power the motor.

3. The vehicle of claim 2, wherein the motor is configured to function as a bearing for the shaft when the motor is powered off.

4. The vehicle of claim 2, wherein rotation of the shaft is driven by the motor only until the vehicle reaches a low predetermined speed.

5. The vehicle of claim 4, wherein rotation of the shaft is driven by the motor and the first and second impellers as the vehicle travels between the low predetermined speed and a high predetermined speed.

6. The vehicle of claim 5, wherein the motor is deactivated and rotation of the shaft is driven by the first and second impeller while the vehicle travels faster than the high predetermined speed.

7. The vehicle of claim 1, further comprising a main body including a closable first aperture corresponding to the first entry and a closable second aperture corresponding to the second entry, the main body further including a closable third aperture corresponding to the first exit and a closable fourth aperture corresponding to the second exit.

8. The vehicle of claim 7, wherein the first aperture, the second aperture, the third aperture and the fourth aperture are opened when the first and second impellers are in use, and the first aperture, the second aperture, the third aperture and the fourth aperture are closed when the first and second impellers are not in use.

9. The vehicle of claim 1, further comprising a drivetrain and a main motor operatively connected to the drivetrain of the vehicle.

10. A method of powering a vehicle, the method comprising:

providing a first path of air and a second path of air moving through the vehicle;
providing a rotating mechanism including a motor including a shaft, a first impeller, a second impeller, a first alternator including a first rotor, and a second alternator including a second rotor, the shaft of the motor extending through the first rotor and the second rotor;
positioning the rotating mechanism such that the first impeller is located in the first path of air and the second impeller is located in the second path of air;
providing at least one secondary battery to be charged by the first alternator or the second alternator; and
charging the at least one secondary battery using the first alternator or the second alternator.

11. The method of claim 10, wherein the at least one secondary battery is configured to power the motor.

12. The method of claim 10, further comprising activating the motor to rotate the shaft.

13. The method of claim 10, further comprising driving rotation of the shaft using only the motor until the vehicle reaches a low predetermined speed.

14. The method of claim 13, further comprising driving rotation of the shaft using the motor and the first and second impellers as the vehicle travels between the low predetermined speed and a high predetermined speed.

15. The method of claim 14, further comprising deactivating the motor, using the motor as a bearing for the shaft, and driving rotation of the shaft using the first and second impellers only while the vehicle travels faster than the high predetermined speed.

16. The method of claim 10, wherein the first path of air is defined by a first passage including a first entry, a first chamber and a first exit formed on a main body of the vehicle, the second path of air is defined by a second passage including a second entry, a second chamber and a second exit formed on the main body of the vehicle, the first impeller is located in the first chamber, and the second impeller is located in the second chamber.

17. The method of claim 16, wherein a first aperture, a second aperture, a third aperture and a fourth aperture corresponding to the first entry, the second entry, the first exit and the second exit respectively are formed on the main body of the vehicle.

18. The method of claim 17, further comprising opening the first aperture, the second aperture, the third aperture, and the fourth aperture when the first and second impellers are in use, and closing the first aperture, the second aperture, the third aperture, and the fourth aperture when the first and second impellers are not in use.

19. A rotating system comprising:
a motor including a shaft;
an impeller configured to rotate with the shaft and located in a path of air;
an alternator including a rotor configured to rotate with the shaft; and
at least one secondary battery configured to be charged by the alternator,
wherein rotation of the shaft is configured to be driven by either the motor or the impeller.

20. A vehicle comprising:
a main body formed with a passage defining the path of air and including an entry, a chamber, and an exit;
wherein the passage configured to direct air from the entry to the exit through the chamber, and
wherein the rotating system of claim 19 is positioned such that the impeller is located in the chamber.

* * * * *